United States Patent
Skiba et al.

(10) Patent No.: US 10,446,859 B2
(45) Date of Patent: Oct. 15, 2019

(54) FUEL CELL GAS INLET MANIFOLD DRAIN

(75) Inventors: Tommy Skiba, East Hartford, CT (US); Christopher John Carnevale, Vernon, CT (US)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/403,146

(22) PCT Filed: May 24, 2012

(86) PCT No.: PCT/US2012/039232
§ 371 (c)(1),
(2), (4) Date: Nov. 21, 2014

(87) PCT Pub. No.: WO2013/176668
PCT Pub. Date: Nov. 28, 2013

(65) Prior Publication Data
US 2015/0099201 A1 Apr. 9, 2015

(51) Int. Cl.
*H01M 8/04* (2016.01)
*H01M 8/04119* (2016.01)
*H01M 8/2485* (2016.01)

(52) U.S. Cl.
CPC ..... *H01M 8/04156* (2013.01); *H01M 8/2485* (2013.01)

(58) Field of Classification Search
CPC .................. H01M 8/04126; H01M 8/2485
USPC .......................................... 429/413
See application file for complete search history.

(56) References Cited

U.S. PATENT DOCUMENTS

| 6,936,369 | B1* | 8/2005 | Komura | H01M 8/0247 429/457 |
| 7,132,189 | B2 | 11/2006 | Inai et al. | |
| 2003/0068543 | A1* | 4/2003 | Yasuo | H01M 8/0263 429/414 |
| 2004/0202911 | A1 | 10/2004 | Komura et al. | |
| 2006/0147776 | A1* | 7/2006 | Sarata | C01B 3/065 429/416 |
| 2008/0138665 | A1 | 6/2008 | Lewinski et al. | |
| 2009/0325011 | A1* | 12/2009 | Nakagawa | H01M 8/0271 429/492 |
| 2011/0053011 | A1 | 3/2011 | Owejan et al. | |
| 2012/0107704 | A1* | 5/2012 | Chin | H01M 8/04291 429/414 |

(Continued)

FOREIGN PATENT DOCUMENTS

| JP | 405251107 A | * | 9/1993 |
| JP | 2001-236975 A |   | 8/2001 |
| JP | 2003-346869 A |   | 12/2003 |

(Continued)

OTHER PUBLICATIONS

Translation of JP 2011-003447A.*
Translation of JP405251107A.*
Translation of KR100700073B1.*

*Primary Examiner* — Jonathan G Leong
*Assistant Examiner* — Victoria H Lynch
(74) *Attorney, Agent, or Firm* — Seed IP Law Group LLP

(57) ABSTRACT

An exemplary manifold assembly includes a gas inlet manifold configured to introduce a gas to a fuel cell. A gas outlet manifold is configured to direct gas away from the fuel cell. A drain channel connects the inlet manifold to the outlet manifold. The drain channel is configured to carry liquid from the gas inlet manifold to the gas outlet manifold.

8 Claims, 1 Drawing Sheet

(56) References Cited

U.S. PATENT DOCUMENTS

2012/0196202 A1* 8/2012 McInerney ....... H01M 8/04082
429/444

FOREIGN PATENT DOCUMENTS

| | | | |
|---|---|---|---|
| JP | 2005-251526 | A | 9/2005 |
| JP | 2006-139944 | A | 6/2006 |
| JP | 2007-26856 | A | 2/2007 |
| JP | 2007-141524 | A | 6/2007 |
| JP | 2008-311160 | A | 12/2008 |
| JP | 2011003447 | A * | 1/2011 |
| KR | 100700073 | B1 * | 3/2007 |

* cited by examiner

FUEL CELL GAS INLET MANIFOLD DRAIN

STATEMENT REGARDING FEDERALLY SPONSORED RESEARCH OR DEVELOPMENT

This invention was made with government support under Contract No. CA-04-7003-00 awarded by the Department of Transportation. The Government therefore has certain rights in this invention.

BACKGROUND

Fuel cells utilize an electrochemical reaction for generating electricity. The electrochemical reaction involves reactants such as hydrogen and oxygen. Air is typically used as the source of oxygen. Introducing air to a cell stack assembly often introduces moisture because of the humidity of the air. There are various challenges associated with managing the effects of moisture in air introduced into a fuel cell.

SUMMARY

An exemplary manifold assembly includes a gas inlet manifold configured to introduce a gas to a fuel cell. A gas outlet manifold is configured to direct gas away from the fuel cell. A drain channel connects the inlet manifold to the outlet manifold. The drain channel is configured to carry liquid from the gas inlet manifold to the gas outlet manifold.

The drain channel allows for removing condensate liquid from the gas inlet manifold to prevent such liquid from interfering with the intended supply of the gas to the fuel cell.

An exemplary fuel cell includes a stack cell assembly having a plurality of cells that are configured to facilitate an electrochemical reaction. A gas inlet manifold is on one side of the cell stack assembly. The gas inlet manifold is configured to introduce a gas to the cell stack assembly. A gas outlet manifold is on another side of the cell stack assembly. The gas outlet manifold is configured to direct gas away from the cell stack assembly. A drain channel connects the gas inlet manifold to the gas outlet manifold. The drain channel is configured to carry liquid from the inlet manifold to the outlet manifold.

An exemplary fluid management method for use with a fuel cell device includes establishing a liquid draining connection between a gas inlet manifold on one side of a fuel cell stack assembly and a gas outlet manifold on another side of the cell stack assembly. Liquid is permitted to flow from the gas inlet manifold through the draining connection and into the gas outlet manifold.

The various features and advantages of disclosed examples will become apparent to those skilled in the art from the following detailed description. The drawings that accompany the detailed description can be briefly described as follows.

DETAILED DESCRIPTION

Figure 1:
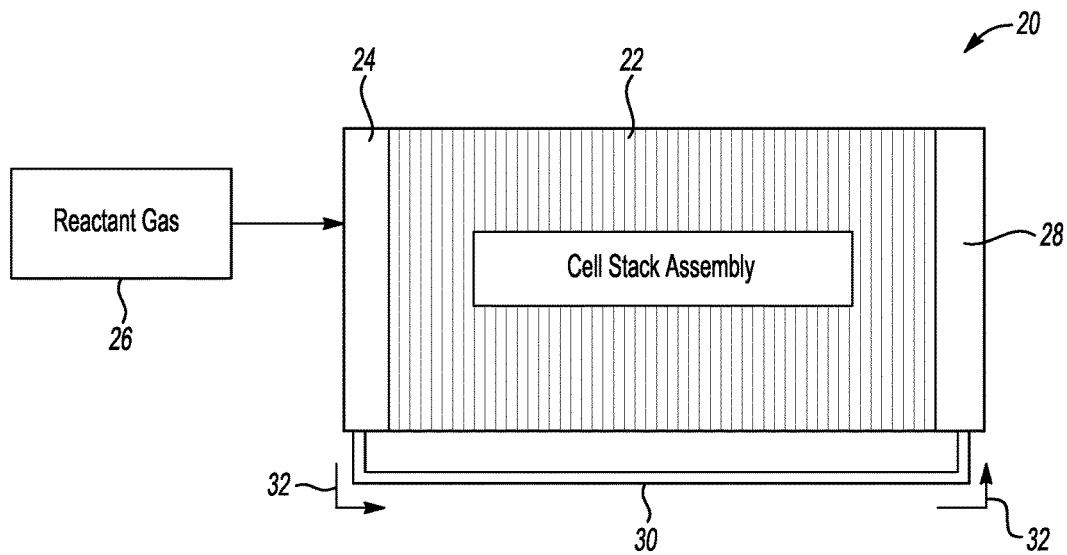
FIG. 1 schematically illustrates selected portions of a fuel cell device designed according to an embodiment of this invention.

FIG. 1 schematically shows a fuel cell device 20. A cell stack assembly 22 includes a plurality of individual cells that are configured to facilitate an electrochemical reaction. Example cells may comprise PEM fuel cells or phosphoric acid fuel cells. Those skilled in the art understand how cell stack assemblies are arranged.

A gas inlet manifold 24 is provided on one side of the cell stack assembly 22. The gas inlet manifold 24 facilitates introducing a reactant gas 26 to the cell stack assembly 22. In one example, the reactant gas 26 comprises air for introducing oxygen into the cell stack assembly 22. Oxygen is used in an electrochemical reaction within a fuel cell in a known manner.

The example of FIG. 1 includes a gas outlet manifold 28 on another side of the cell stack assembly 22. In this example, the gas inlet manifold 24 is on an opposite side of the cell stack assembly from the gas outlet manifold 28 but that is not the only possible arrangement. Various positions of the manifolds 24 and 28 are possible.

Using air for introducing the reactant gas 26 includes the possibility of liquid condensation within the gas inlet manifold 24. Air typically has some amount of humidity or moisture within it. Any moisture entrained in the gas provided to the gas inlet manifold 24 may condense on an inside surface of the gas inlet manifold 24. Such condensation may occur because of differences in temperature, for example, between the walls of the manifold 24 and the air that is introduced into the manifold 24. The illustrated example includes a drain channel 30 connected between the gas inlet manifold 24 and the gas outlet manifold 28. In one example, the drain channel 30 comprises a tube. The drain channel 30 facilitates removing any liquid condensation from the gas inlet manifold 24 as such liquid is allowed to flow through the drain channel 30 as schematically shown by the arrows 32. Given that the gas outlet manifold 28 is already configured for directing fluid away from the cell stack assembly 22, the liquid from the drain channel 30 may be removed from the gas outlet manifold 28 and directed to another portion (not illustrated) of the fuel cell system.

The drain channel 30 is connected with the gas inlet manifold 24 in a position (e.g., near a bottom or a lower end) where gravity facilitates movement of any liquid condensation into the drain channel 30. A gravitational pull may be useful for urging liquid into the drain channel and partially along that channel. In some configurations, gravitational pull will direct the liquid the entire way through the drain channel 30 and into the gas outlet manifold 28. In some examples, the pressure differential across the cell stack assembly 22 is used at least partially for urging the liquid through the drain channel 30 and into the outlet manifold 28.

The gas introduced into the gas inlet manifold 24 is intended to be provided to the cell stack assembly 22. The illustrated example includes a flow restrictor associated with the drain channel 30 to restrict a flow of gas through the drain channel 30 while permitting liquid flow through that channel. The flow restrictor may be in the drain channel 30, at an interface between the drain channel 30 or across an opening in the manifold 24 to which the drain channel is connected.

Figure 2:
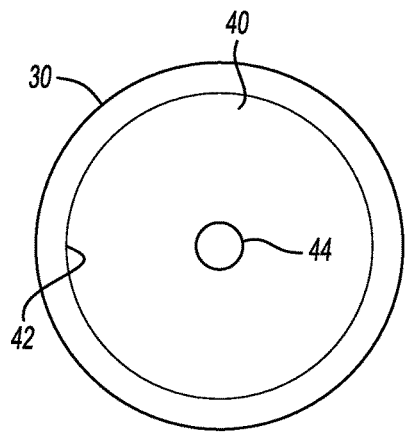
FIG. 2 schematically illustrates an example flow restrictor useful with an embodiment consistent with the example of FIG. 1.

FIG. 2 illustrates one example flow restrictor. This example comprises a diaphragm 40. An outside dimension 42 of the diaphragm 40 corresponds to an inside dimension of the drain channel 30 or an opening in the gas inlet manifold 24 to which the drain channel 30 is connected. The diaphragm includes an opening 44 that has a dimension that is much smaller than the outside dimension 42 of the diaphragm. The opening 44 allows at least liquid droplets to pass through from the gas inlet manifold 24 into the drain channel 30.

Figure 3:
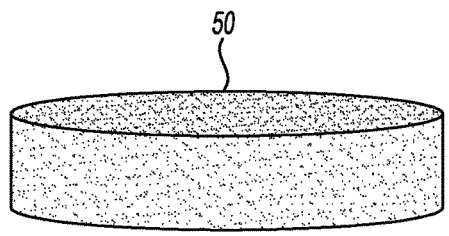
FIG. 3 schematically illustrates another example flow restrictor.

FIG. 3 schematically illustrates another flow restrictor 50, which is a wet seal. One example embodiment of the flow restrictor 50 comprises a porous plate or disk located within the drain channel 30, across an interface between the drain channel 30 and the gas inlet manifold 24 or over an opening in the gas inlet manifold 24 to which the drain channel 30 is connected The porous member 50 allows for liquid to pass through the flow restrictor 50. When the porous member 50 is at least partially saturated (i.e., the pores are at least partially blocked by liquid), that limits or prevents gas flow through the porous member 50. Even when dry, the porous member 50 reduces possible gas flow through the drain channel 30. Preventing or limiting gas flow through the drain channel 30 facilitates having as much of the gas introduced into the manifold 24 supplied to the cell stack assembly 22 as possible.

Figure 4:
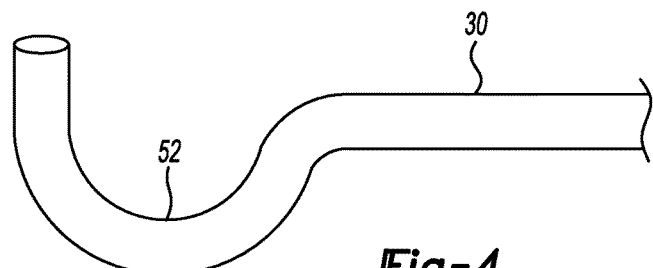
FIG. 4 schematically illustrates another example flow restrictor.

FIG. 4 illustrates another example flow restrictor configuration. This example comprises a section 52 of the drain channel 30 that is configured to at least temporarily retain liquid. Liquid retained in the section 52 establishes a barrier across which gas from the gas inlet manifold 24 will not pass under many operating conditions. One limitation of the example of FIG. 4 compared to the examples of FIGS. 2 and 3 is that it depends on the presence of at least some liquid within the section 52 of the drain channel 30 to restrict gas flow through the drain channel 30.

A manifold assembly designed consistent with the disclosed examples provides the ability to manage liquid content within a gas inlet manifold of a fuel cell device.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell, comprising:
    a cell stack assembly including a plurality of cells that are configured to facilitate an electrochemical reaction;
    a gas inlet manifold positioned on one side of the cell stack assembly and outside the plurality of cells, the gas inlet manifold being configured to introduce a gas to each of the plurality of cells of the cell stack assembly, the gas inlet manifold having an upper end and a lower end, the gas inlet manifold arranged vertically so that the gas inlet manifold has a longest dimension and an overall length that extend from the upper end to the lower end;
    a gas outlet manifold positioned on another side of the cell stack assembly and outside the plurality of cells, the gas outlet manifold being configured to direct gas away from each of the plurality of cells of the cell stack assembly, the gas outlet manifold arranged vertically and parallel to the gas inlet manifold;
    a drain channel coupled to the lower end of the gas inlet manifold, the drain channel connecting the gas inlet manifold to the gas outlet manifold, the drain channel being configured to carry liquid from the gas inlet manifold to the gas outlet manifold; and
    a wet seal associated with the drain channel to restrict gas flow from the gas inlet manifold into the drain channel, wherein the wet seal is positioned at an interface between the gas inlet manifold and the drain channel.

2. The fuel cell of claim 1, wherein the drain channel comprises a tube.

3. The fuel cell of claim 1, wherein the wet seal comprises a porous member that allows liquid to pass through the porous member and limits gas flow through the porous member.

4. The fuel cell of claim 1, wherein the liquid can flow at least partially through the drain channel under the force of gravity.

5. The fuel cell of claim 1 wherein the liquid can flow an entire way through the drain channel and into the gas outlet manifold under the force of gravity.

6. The fuel cell of claim 1 wherein a pressure differential exists between the gas inlet manifold and the gas outlet manifold such that the pressure differential can at least partially urge the liquid through the drain channel and into the gas outlet manifold.

7. A fuel cell system, comprising:
    a cell stack assembly including a plurality of cells that are configured to facilitate an electrochemical reaction;
    a gas inlet manifold on a first side of the cell stack assembly and outside the plurality of cells, the gas inlet manifold being configured to introduce a gas to each of the plurality of cells of the cell stack assembly, the gas inlet manifold having an upper end and a lower end, the gas inlet manifold arranged vertically so that the gas inlet manifold has a longest dimension and an overall length that extend from the upper end to the lower end;
    a gas outlet manifold on a second side of the cell stack assembly opposite to the first side and outside the plurality of cells, the gas outlet manifold being configured to direct gas away from each of the plurality of cells of the cell stack assembly, the gas outlet manifold arranged vertically and parallel to the gas inlet manifold;
    a drain channel coupled at a first end to the lower end of the gas inlet manifold and at a second end to the gas outlet manifold, the drain channel positioned externally with respect to the cell stack assembly and oriented perpendicularly with respect to each of the plurality of cells; and
    a diaphragm associated with the drain channel to restrict gas flow from the gas inlet manifold into the drain channel, wherein the diaphragm has an outside dimension corresponding to an inside dimension of the drain channel and includes a hole through the diaphragm, the hole being smaller in size than the inside dimension of the drain channel.

8. The fuel cell system of claim 7 wherein the drain channel is configured to remove liquid from the gas inlet manifold to prevent the liquid from entering the plurality of cells of the cell stack assembly.

* * * * *